United States Patent
Tassinari

(10) Patent No.: US 11,647,803 B2
(45) Date of Patent: May 16, 2023

(54) METHOD FOR MANUFACTURING AN ARTICLE OF UNDERWEAR SUCH AS BRA

(71) Applicant: CALZEDONIA S.P.A., Malcesine (IT)

(72) Inventor: Giorgio Tassinari, Molinella (IT)

(73) Assignee: CALZEDONIA S.P.A., Malcesine (IT)

( * ) Notice: Subject to any disclaimer, the term of this patent is extended or adjusted under 35 U.S.C. 154(b) by 261 days.

(21) Appl. No.: 16/950,425

(22) Filed: Nov. 17, 2020

(65) Prior Publication Data
US 2021/0153586 A1 May 27, 2021

(30) Foreign Application Priority Data

Nov. 26, 2019 (IT) .......................... 102019000022143

(51) Int. Cl.
*A41C 5/00* (2006.01)
*A41H 43/04* (2006.01)

(52) U.S. Cl.
CPC ............... *A41H 43/04* (2013.01); *A41C 5/00* (2013.01)

(58) Field of Classification Search
CPC ................................ A41C 5/005; A41H 43/04
(Continued)

(56) References Cited

U.S. PATENT DOCUMENTS 4,701,964 A * 10/1987 Prunesti ................. A41H 43/00
  450/40
4,776,916 A * 10/1988 Prunesti ................ B29C 65/526
  156/578

(Continued)

FOREIGN PATENT DOCUMENTS

EP  1 123 666 A2  8/2001
EP  1 123 666 A3  8/2001
(Continued)

OTHER PUBLICATIONS

Italian Search Report dated Jul. 16, 2020 in Italian Application 102019000022143 filed Nov. 26, 2019 (with English translation of Categories of Cited Documents), citing documents AA-AB and AO-AQ therein, 3 pages.

(Continued)

*Primary Examiner* — Gloria M Hale
(74) *Attorney, Agent, or Firm* — Oblon, McClelland, Maier & Neustadt, L.L.P.

(57) ABSTRACT

A method of manufacturing a bra, comprising providing a first fabric layer as an outer layer, a second fabric layer as an inner layer, and a material made of thermo-adhesive polyurethane film that joins elements between the two fabric layers in a finished bra; sprinkling the first fabric layer on a side facing the second fabric layer with a reactive hotmelt polyurethane glue, which is reactivated only once; applying the thermo-adhesive polyurethane film on a side of the second fabric layer facing the first fabric layer; superimposing the two fabric layers such that the side of the first fabric layer covered with the glue faces the second layer and the thermo-adhesive polyurethane film portions applied to the second fabric layer face the first fabric layer; joining the two layers by hot-pressing with the thermo-adhesive polyurethane film portions, and reactivating the polyurethane glue to become temporarily in a liquid phase and triggering a cross-linking process causing the glue to solidify permanently.

12 Claims, 3 Drawing Sheets

(58) Field of Classification Search
USPC .............................................................. 2/252
See application file for complete search history.

(56) References Cited

U.S. PATENT DOCUMENTS

| | | | | |
|---|---|---|---|---|
| 6,344,238 B1* | 2/2002 | Schmitt | .................. | A41D 27/06 |
| | | | | 428/206 |
| 7,682,219 B2* | 3/2010 | Falla | .................... | A41C 3/0014 |
| | | | | 450/92 |
| 2015/0017877 A1* | 1/2015 | Cholet | .................. | A41C 5/005 |
| | | | | 450/92 |

FOREIGN PATENT DOCUMENTS

| EP | 2 826 389 A1 | 1/2015 |
|---|---|---|
| WO | WO 2014/202477 A1 | 12/2014 |

OTHER PUBLICATIONS

European Office Action dated Jan. 28, 2022 in European Patent Application No. 20 209 697.0, 24 pages.

* cited by examiner

METHOD FOR MANUFACTURING AN ARTICLE OF UNDERWEAR SUCH AS BRA

CROSS-REFERENCE TO RELATED APPLICATION

This application is based upon and claims the benefit of priority from Patent Application IT 102019000022143, filed on Nov. 26, 2019.

BACKGROUND OF THE INVENTION

Field of the Invention

The present invention relates to a method for manufacturing an article of underwear, in particular a bra.

DESCRIPTION OF THE RELATED ART

An article of this type must obviously have in general good elasticity characteristics for being able to guarantee a high level of comfort for the person who wears it, preventing discomfort or even skin irritations.

To obtain the desired degree of elasticity, strips of elastic fabric are normally used which however cannot generally ensure optimal results in terms of comfort and prevent, for example, the formation of marks on the skin due to the pressure that such elastics generate. An alternative, particularly in the event of bras formed by two superimposed layers of fabric, could consist in the use of silicone elements that act both as an elastic element, and as a joining element of the two layers of fabric.

However, silicone is often opposed as it can be harmful for health. Furthermore, the use of silicone elements would cause problems in the final thermo-forming step of the bra for shaping it into the definitive form required from the aesthetic and wearability point of view. In fact, thermo-forming is usually performed at temperatures close to 200° C., which would imply a risk of melting the silicone material and the consequent damage of the article.

SUMMARY OF THE INVENTION

A general object of the present invention is to overcome the aforementioned drawbacks by providing a method for making an article of underwear, in particular a bra, which does not require elastics for reaching the required wearability characteristics.

A further object of the present invention is to provide a method for making a bra, which is free from silicone materials.

In view of such object, it has been thought, according to the invention, to realize a method for manufacturing an article of underwear, in particular a bra, comprising the steps of:
- providing a first fabric layer, designed to realize the outer layer of the underwear article, cut according to a shape substantially corresponding to the plane projection of the stretched underwear article;
- providing a second fabric layer, designed to realize the inner layer of the underwear article, cut according to a shape substantially corresponding to the plane projection of the stretched underwear article;
- providing a third film material, designed to realize permanent joining elements between the first fabric layer and the second fabric layer in the finished underwear article, said third film material being cut to form at least one central underbreast portion, a pair of upper portions destined to be arranged in correspondence of the bra shoulder straps and a pair of side portions destined to be arranged in correspondence of the sides of the bra, and said third film material being a "silicone-free" thermo-adhesive polyurethane film;
- sprinkling said first fabric layer, on its side destined to face the second fabric layer, with a reactive "hotmelt" polyurethane glue, capable of being reactivated only once, by heating, within a reactivation period of time of at least 3 days from the application, preferably within 5 days from the application;
- applying the aforesaid thermo-adhesive polyurethane film portions in position on the side of the second fabric layer destined to face the first fabric layer and to heat-seal said portions on said second fabric layer by hot pressing;
- superimposing said first and second fabric layers, with the side of the first fabric layer covered with reactive polyurethane glue faced towards the second fabric layer and the thermo-adhesive polyurethane film portions applied to the second fabric layer facing the first fabric layer;
- within said reactivation period of the reactive "hotmelt" polyurethane glue, joining, by hot-pressing, the two layers of fabric cut according to the respective shapes, with the aforesaid thermo-adhesive polyurethane film portions interposed between them, reactivating the reactive polyurethane glue to bring it temporarily in a liquid phase, suitable for penetrating through the fibers of the fabrics to be joined, and subsequently triggering a chemical cross-linking process to solidify it definitively for the definitive and permanent fixing of the parts;
- at the end of the cross-linking process of the polyurethane glue, thermoforming the underwear article according to the desired shape;
- applying shoulder straps, hooks, labels and other possible accessories for the final completion of the underwear article.

BRIEF DESCRIPTION OF THE DRAWINGS

To clarify the explanation of the innovative principles of the present invention and the advantages thereof with respect to the prior art, one possible illustrative embodiment applying such principles will be described below, with the aid of the attached drawings. In the drawings.

DETAILED DESCRIPTION

The bra according of the manufacturing method according to the invention is of the type comprised of two superimposed fabric layers, an outer one, with strictly aesthetic functions, and an inner one adapted to ensure high comfort and wearability features for the person wearing it.

The manufacturing method of an article of underwear according to the invention first of all envisages providing a first fabric layer 11, designed to realize the outer layer of the bra, which is cut according to a shape 12 corresponding to the plane projection of the stretched underwear article, but of slightly greater dimensions with respect to the shape that the article itself must have once finished.

"Plane projection of the stretched article" means herein the shape of the article (or a portion thereof) stretched out on a plane. Substantially, such shape corresponds to the one known, in the tailoring/dressmaking world, as a "paper pattern", i.e. the profile according to which it is necessary to cut the fabric for making a garment.

The manufacturing method according to the invention further envisages providing a second fabric layer 13, designed to realize the inner layer of the bra, cut according to a shape 14 substantially corresponding to the plane projection of the stretched underwear article.

The first fabric layer 11 will therefore have slightly larger dimensions with respect to the second fabric layer 13.

Figure 1:
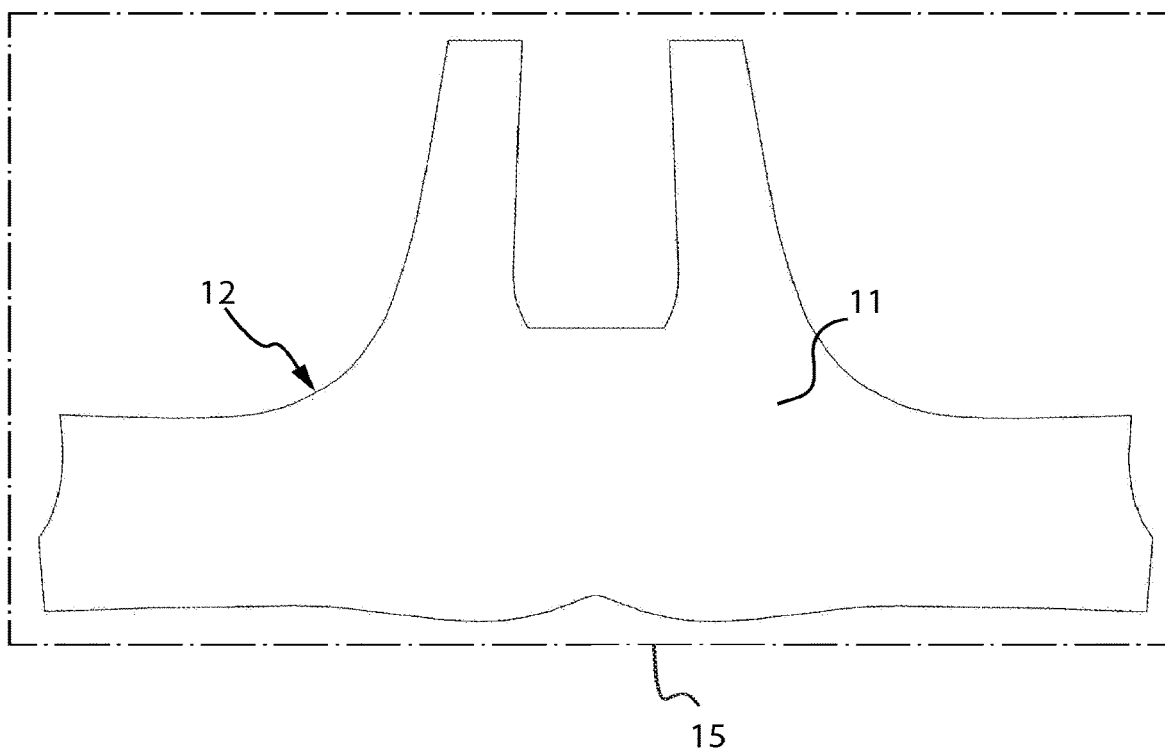
FIG. 1 represents a view of the plan profile of the first shaped fabric layer before assembly.
Figure 2:
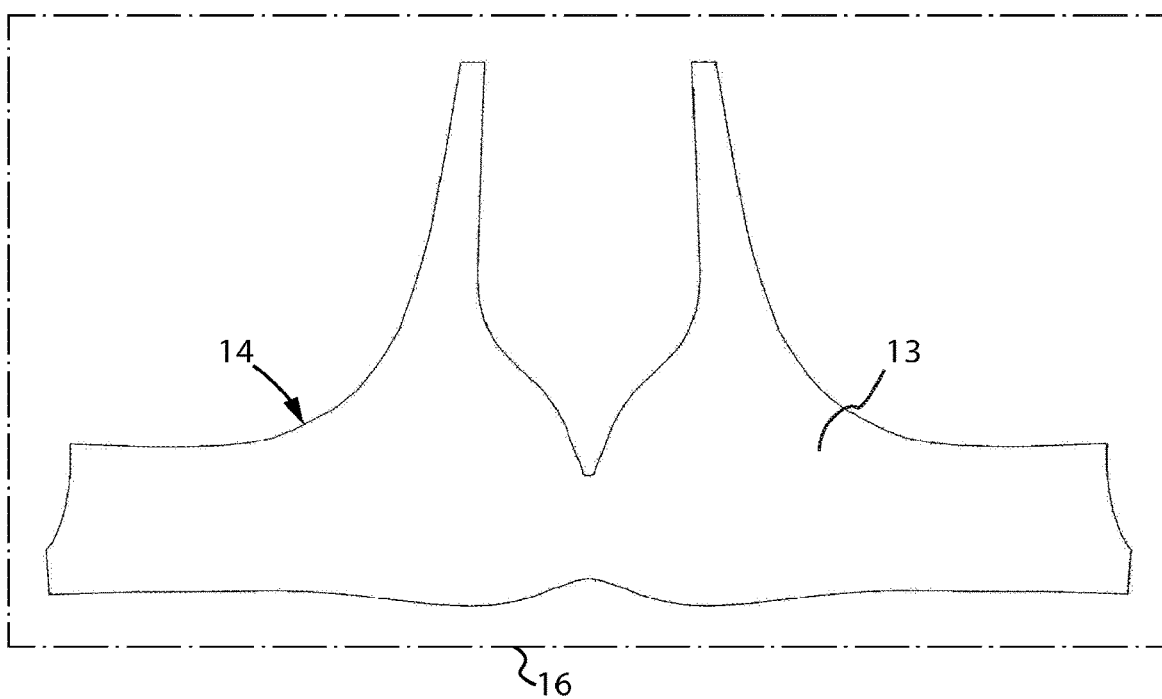
FIG. 2 represents a view of the plan profile of the second shaped fabric layer before assembly.

According to the specific organizational requirements of the production site, said first and second fabric layers 11, 13 can be provided as continuous strips or in the form of pieces of cloth of finished dimensions. FIGS. 1 and 2 schematically represent the strips or pieces of cloth 15, 16 from which the shapes 12, 14 are cut out, respectively.

The type of material that constitutes said first fabric layer 11 will be essentially selected based on the desired aesthetic characteristics for the article. For example, such material can be selected from lace, tulle, microfiber, silk, stretch cotton, etc.

The type of material that constitutes the second fabric layer 13 will instead be essentially selected based on the desired comfort and wearability characteristics for the article. For example, such material can be selected from microfiber, tulle, silk, stretch cotton, etc.

The manufacturing method according to the invention further envisages providing a third film material 17, designed to realize permanent joining elements between the first fabric layer 11 and the second fabric layer 13 in the finished underwear article.

Figure 3:
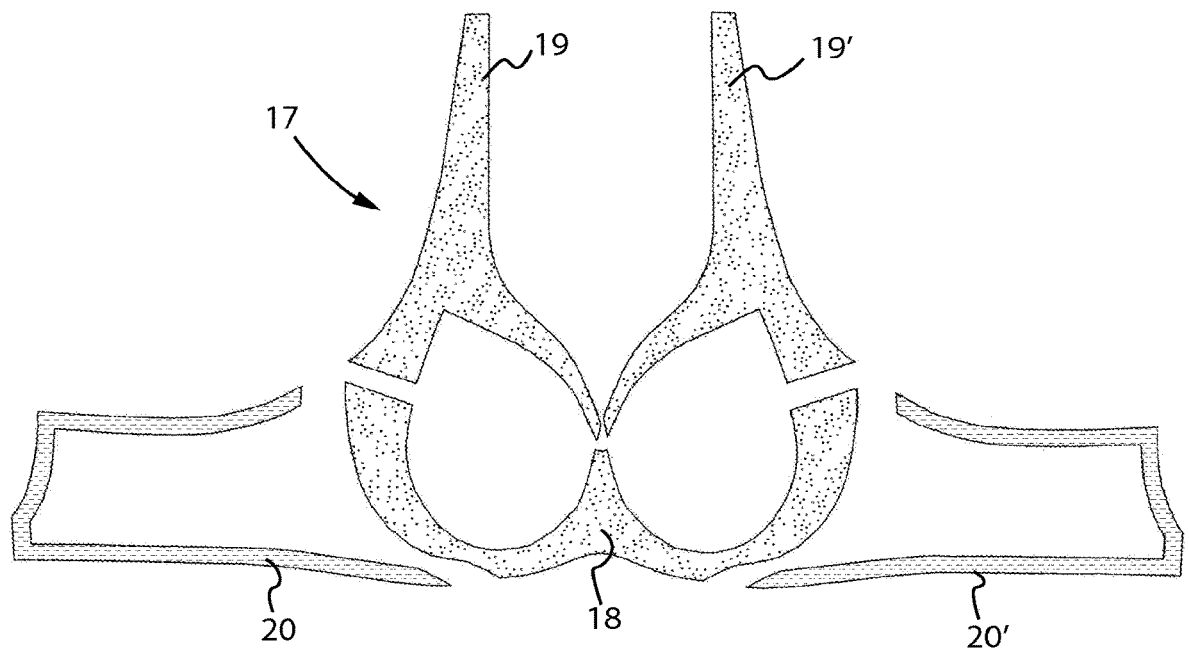
FIG. 3 represents a plan view of the various elements used for connecting the two shaped fabric layers that compose the bra.

As schematically illustrated in FIG. 3, this third film material 17 is cut into suitable shapes for forming respectively at least one central underbreast portion 18, a pair of upper portions 19, 19', destined to be arranged in correspondence of the bra shoulder straps and a pair of side portions 20, 20' destined to be arranged in correspondence of the sides of the bra.

The film material 17 used for realizing said permanent joining elements between the first fabric layer 11 and the second fabric layer 13 is a "silicone-free" thermo-adhesive polyurethane film material.

Advantageously, two different weights of said thermo-adhesive polyurethane film are used: a first material, so-called "heavy", for realizing the central underbreast portion 18 and upper strap portions 19, 19', and a second material, so-called "light", for realizing the lateral side portions 20, 20' having a lower thickness and weight per square meter than the previous one.

More particularly, for said "heavy" thermo-adhesive polyurethane film, a film having a thickness of 180 μm and weight of 210 g/m$^2$ can be used and for the light thermo-adhesive polyurethane film a film having thickness of 75 μm and weight of 90 g/m$^2$ can be used. For example, for these two types of thermo-adhesive polyurethane material, films made by the company FaitPlast have been found optimal for use, known as "Easy-Tech 1381" and "Easy-Tech 897", respectively. According to the operating features of the production plant, there may be simultaneously the supply, preparation and cutting of the first and second fabric layers 11, 13 and of the thermo-adhesive polyurethane film 17, or a specific sequential order may be envisaged, while remaining within the scope of the innovative principles of the present invention.

The manufacturing method according to the invention further comprises sprinkling said first fabric layer 11, on its inner side (i.e. the one destined to face the second fabric layer 13), with a reactive "hotmelt" polyurethane glue (PUR), capable of being reactivated only once, by heating, within a reactivation period of time of at least 3 days from the application, preferably within 5 days from the application.

The application of the glue onto the fabric is performed hot, at about 140° C., so that it is in the liquid state. After about 30 seconds, this glue spread onto the fabric will pass to the solid state, a condition that will be maintained until the subsequent reactivation thereof.

For this purpose, the use of a reactive polyurethane glue made by the company Kleiberit and known as "Kleiberit 900.7.9967" has been found to be particularly advantageous.

According to the operating features of the production plant, the glue can be applied to the first fabric layer 11 before or after cutting the fabric according to the shape 12.

Figure 4:
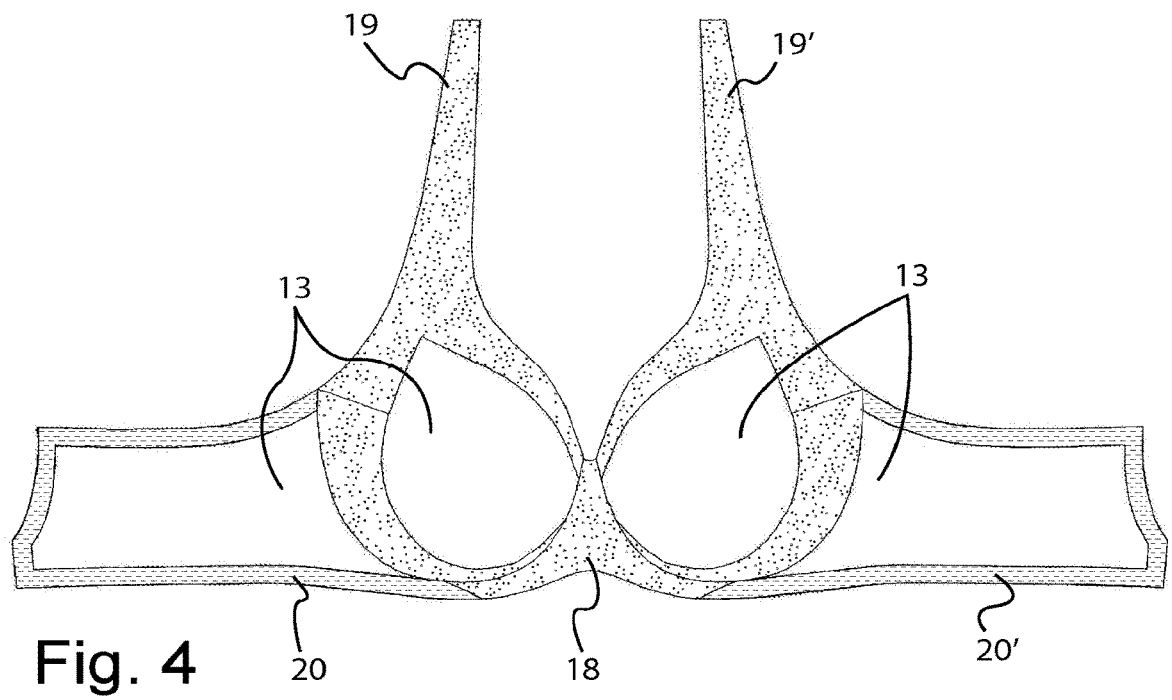
FIG. 4 represents a plan view of the second shaped fabric layer, with the aforesaid connection elements applied before joining with the first shaped fabric layer.

The manufacturing method according to the invention further envisages applying the aforesaid central underbreast portions 18, upper shoulder strap portions 19, 19' and lateral side portions 20, 20', made of thermo-adhesive polyurethane film 17, in the correct position on the inner side (i.e. the one destined to face the first fabric layer 11) of the second fabric layer 13, as shown in FIG. 4, and heat-sealing said portions onto the fabric layer 13 using a hot press for about 15-20 seconds, preferably 16 seconds, at a temperature of about 160° C.

Once said portions 18, 19, 19', 20, 20' have been fixed to the fabric layer 13, the protection support of the thermo-adhesive polyurethane film 17 is removed, as well known to a person skilled in the art, leaving only the elastic part of the polyurethane film 17 coupled to said fabric layer 13.

After performing the operations described up to here, and however within the period in which said "hotmelt" reactive polyurethane glue is still reactivatable, the joining of the two fabric layers 11, 13 (previously cut according to the respective shapes 12, 14) can begin, with the portions 18, 19, 19', 20, 20' of thermo-adhesive polyurethane film 17 interposed between them, until the definitive and permanent fixing of the parts. For performing the joining step of the two fabric layers 11, 13, it may be advantageous to arrange the first fabric layer 11, destined to realize the outer layer of the bra, on a plane with the side covered with reactive polyurethane glue turned upwards, making the second layer of fabric 13, destined to realize the inner layer of the bra, rest on it, with the portions of thermo-adhesive polyurethane film 17 turned downwards, and taking care so that the shape 14 of said second fabric layer 13 fits into the shape 12 of the first fabric layer 11.

In this way, the portions 18, 19, 19', 20, 20' of thermo-adhesive polyurethane film 17 will be correctly interposed between the two fabric layers 11, 13.

Figure 5:
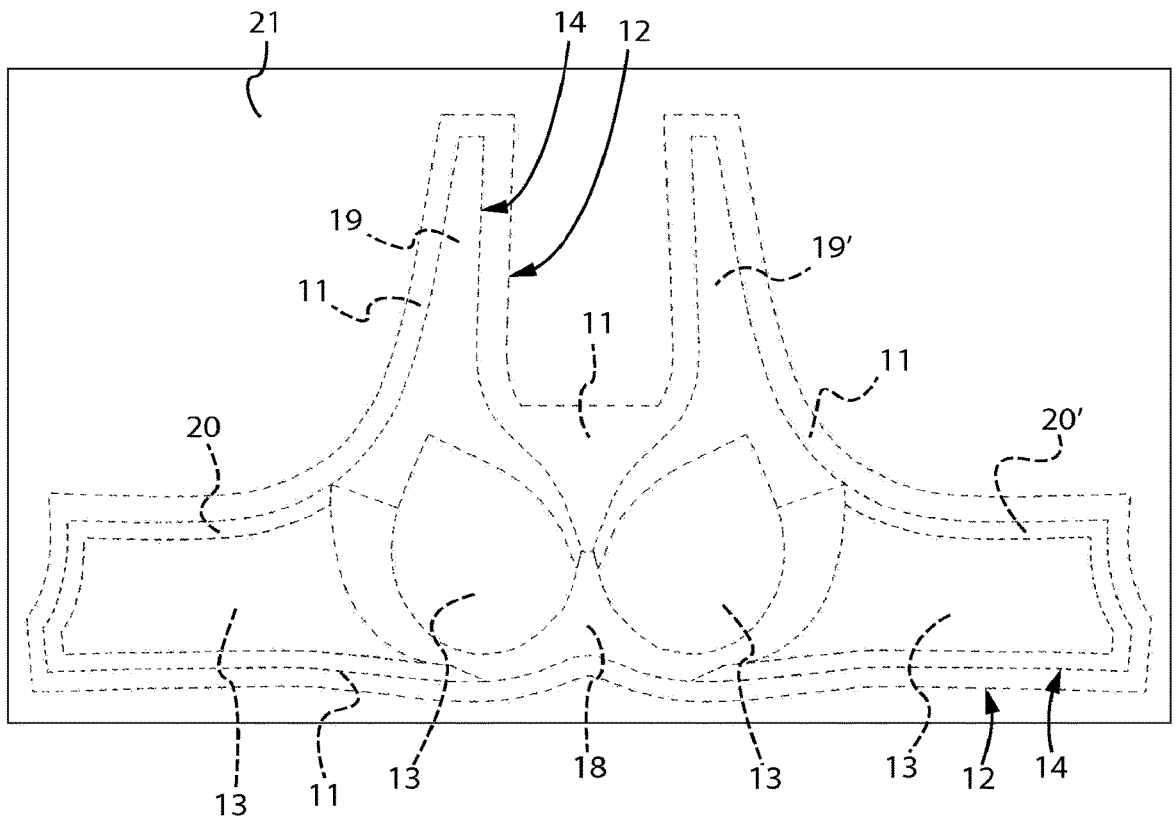
FIG. 5 represents a plan view of the two shaped fabric layers superimposed with one another with the aforesaid connection elements interposed, covered by a sheet of protective paper before the hot joining of the various components.

The assembly of the two fabric layers 11, 13, with the portions of thermo-adhesive polyurethane film 17 interposed, are then advantageously covered by a paper sheet 21, as shown in FIG. 5, whose function will be described below.

At this point, a hot-pressing of the two superimposed layers of fabric 11, 13 is performed. Thanks to the characteristics described above of the glue used, this operation may be performed within 5 days from the application of the glue itself.

For performing this operation, the assembly of superimposed layers of fabric 11, 13, with the portions of thermo-adhesive polyurethane film 17 interposed and covered with the layer of protective paper 21, is positioned under the plane of a hot press, which subjects the material to heating up to about 120° C. for at least 10 seconds.

Such heating reactivates the "hotmelt" reactive polyurethane glue (PUR), which returns again to the liquid state penetrating through the fibres of the fabrics to be joined. This reaction of the glue initially creates a first mechanical 'gripping' step and further initiates a chemical cross-linking process that leads it to solidify definitively, so that the glue itself cannot be removed unless mechanically, ripping the two edges of fabric. Complete cross-linking of the type of glue used in the manufacturing method according to the invention takes place in about 7 days.

The sheet of paper 21 has the function of preventing, during the heating step in the press, and consequent liquefaction of the "hotmelt" polyurethane glue, the latter getting stuck to the plane of the press at the edges of the first fabric layer 11 exceeding the shape 14 of the second fabric layer 13.

Figure 6:
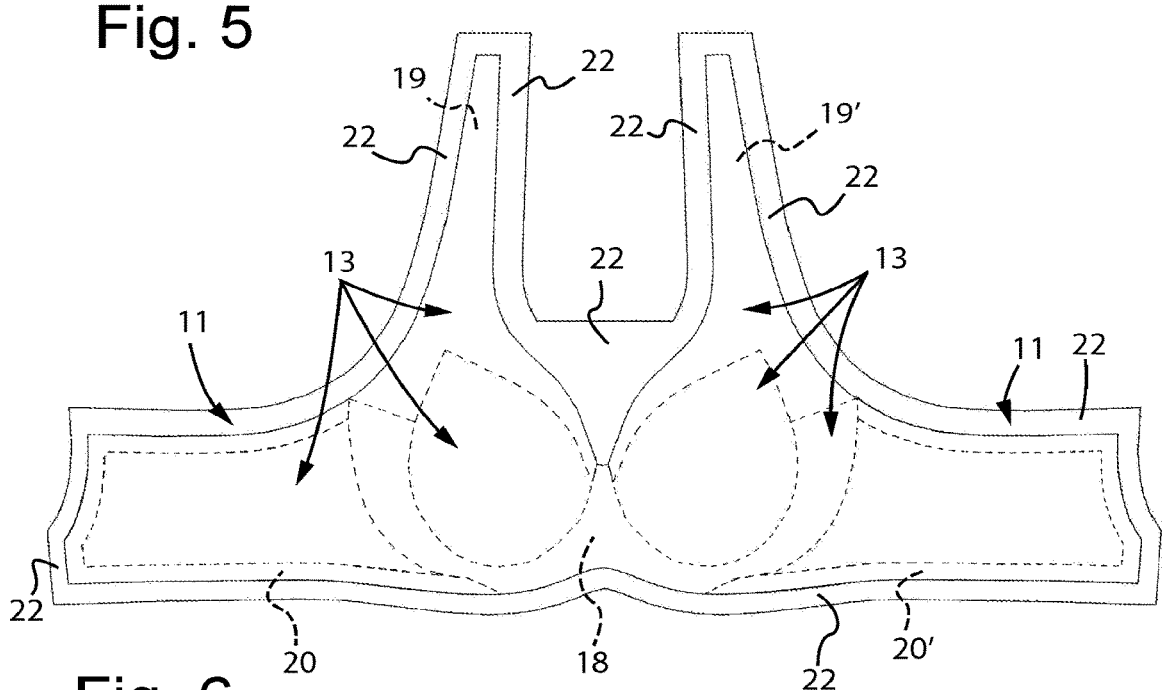
FIG. 6 represents a plan view of the underwear article with the two fabric layers assembled, before the operation of trimming the excess edges.

Once the hot-pressing of the two superimposed fabric layers 11, 13 has been performed, the paper sheet 21 is removed and the underwear article appears as in FIG. 6, with the second fabric layer 13 that partially covers the first fabric layer 11, with the portions 18, 19, 19', 20, 20' of thermo-adhesive polyurethane film 17 interposed between the two fabric layers 11, 13. Given that, as has been seen, the first fabric layer 11 is initially shaped with dimensions slightly exceeding the second fabric layer 13, the underwear article will now temporarily have exceeding peripheral edges 22 made of said first fabric layer 11.

Once at least 7 days have passed from the hot-pressing (i.e. the necessary time for ensuring the complete cross-linking of the polyurethane glue), thermoforming of the article takes place to give the bra the desired shape and size of the cups. Such process is well known to a person skilled in the art and, therefore, will not be described herein in detail.

At this point, the exceeding edges 22 of the first fabric layer 11 are trimmed (also here, according to techniques and methods known to a person skilled in the art) following the profile of the finished garment. Finally, it is possible to proceed with the application of adjustable shoulder straps, hooks, labels, etc., through normal sewing operations, for the definitive completion of the garment.

It is at this point clear how the method for the manufacturing of an article of underwear according to the invention enables a garment to be obtained with the best wearability characteristics although not using elastics or silicone-based materials.

Clearly, the above description of an embodiment applying the innovative principles of the present invention is given by way of an illustrative example of such innovative principles and must not, therefore, be taken to limit the scope of the patent claimed herein.

For example, in addition to the portions 18, 19, 19', 20, 20' of polyurethane thermo-adhesive film 17 designed to realize the joining of two layers of fabric 11, 13, further portions could be provided, in the appropriate positions, depending on the particular aesthetic and/or functional characteristics that may be desired or necessary from time to time.

Furthermore, the shape of the garment and the fabrics of which it is composed may likewise be selected on the basis of the specific desired characteristics.

The invention claimed is:

1. A method for manufacturing a bra, the method comprising:
   providing a first fabric layer, which is an outer layer of the bra, cut according to a shape substantially corresponding to a plane projection of a stretched bra;
   providing a second fabric layer, which is an inner layer of the bra, cut according to a shape substantially corresponding to the plane projection of the stretched bra;
   providing a third film material, which is cut to form thereto-adhesive polyurethane film portions comprising at least one central underbreast portion, a pair of upper portions corresponding to bra shoulder straps, and a pair of side portions corresponding to sides of the bra, wherein the thermo-adhesive polyurethane film portions permanently join, by hot-pressing, the first fabric layer and the second fabric layer in the bra, wherein the third film material is a silicon-free thermo-adhesive polyurethane film;
   applying by sprinkling the first fabric layer, on a side facing the second fabric layer, with a reactive hotmelt polyurethane glue, which is reactivated only once by heating, within a reactivation period of time of at least 3 days from the application of the hotmelt polyurethane glue;
   applying the thermo-adhesive polyurethane film portions that comprise the at least one central underbreast portion, the pair of upper portions, and the pair of side portions to a side of the second fabric layer facing the first fabric layer and heat-sealing the thermo-adhesive polyurethane film portions on the second fabric layer by hot pressing;
   superimposing the first and second fabric layers with a side of the first fabric layer covered with the reactive polyurethane glue faced towards the second fabric layer and the thermo-adhesive polyurethane film portions applied to the second fabric layer facing the first fabric layer;
   within the reactivation period of the reactive hotmelt polyurethane glue, joining by hot-pressing the two fabric layers cut according to respective shapes, with the thermo-adhesive polyurethane film portions interposed between the two fabric layers, reactivating the reactive polyurethane glue to become temporarily in a liquid phase, suitable for penetrating through fibers of fabrics to be joined, and subsequently triggering a chemical cross-linking process to solidify the reactive polyurethane glue permanently, thereby obtaining a permanent fixing of bra parts;
   at the end of the cross-linking process of the reactive polyurethane glue, thermoforming the bra according to a desired shape; and
   applying shoulder straps, hooks, labels and other accessories, thereby manufacturing the bra.

2. The method of claim 1, wherein the thermo-adhesive polyurethane film is supplied in a first heavier weight for the central underbreast portion and the upper shoulder strap portions, and in a second lighter weight for the lateral side portions.

3. The method of claim 2, wherein the thermo-adhesive polyurethane film having the first heavier weight for the central underbreast portion and the upper shoulder strap portions has a thickness of 180 microns and a weight of 210 g/m$^2$ and the thermo-adhesive polyurethane film having the lighter weight for the lateral side portions has a thickness of 75 microns and a weight of 90 g/m$^2$.

4. The method of claim 1, wherein the thermo-adhesive polyurethane film portions are heat-sealed on the second fabric layer by hot pressing from 15 to 20 seconds at a temperature of about 160° C.

5. The method of claim 1, wherein the application of the reactive hotmelt polyurethane glue on the first fabric layer is carried out at a temperature of about 140° C.

6. The method of claim 1, wherein the joining of the two fabric layers with the thermo-adhesive polyurethane film portions interposed between the two fabric layers, is carried out by hot pressing at a temperature of about 120° C. for at least 10 seconds.

7. The method of claim 1, wherein the second fabric layer is cut according to a shape having dimensions substantially corresponding to the shape of the bra, and wherein the first fabric layer is cut according to a shape larger than the shape of the bra.

8. The method of claim 7, wherein the superimposing of the first and second fabric layers, with the thermo-adhesive polyurethane film portions interposed between the first and second fabric layers, is carried out by keeping a shape of the second fabric layer within a shape of the first fabric layer thereby defining peripherally excess edges of the first fabric layer.

9. The method of claim 8, wherein, after the thermoforming of the bra according to a desired shape, the excess peripheral edges are trimmed, following a profile of the finished bra.

10. The method of claim 8, wherein, before the hot pressing, the two fabric layers that are cut according to their respective shapes and have the thermo-adhesive polyurethane film portions interposed between the two fabric layers, are covered with a protective paper sheet to prevent consequent liquefaction of the hotmelt polyurethane glue during the press heating phase and from attaching to a plane of a press in correspondence with excess peripheral edges of the first fabric layer sprinkled with the glue.

11. The method of claim 1, wherein the reactivation period is within 5 days from the application.

12. The method of claim 4, wherein the thermo-adhesive polyurethane film portions are heat-sealed on the second fabric layer by hot pressing for 16 seconds at the temperature of about 160° C.

* * * * *